J. LELAND.
Car-Wheels.

No. 158,848. Patented Jan. 19, 1875.

Witnesses.
S. W. Piper
L. W. Miller

James Leland.
by his attorney
R. H. Eddy

UNITED STATES PATENT OFFICE.

JAMES LELAND, OF CAMBRIDGEPORT, MASSACHUSETTS.

IMPROVEMENT IN CAR-WHEELS.

Specification forming part of Letters Patent No. 158,848, dated January 19, 1875; application filed December 19, 1874.

*To all whom it may concern:*

Be it known that I, JAMES LELAND, of Cambridgeport, of the county of Middlesex and State of Massachusetts, have invented a new and useful Improvement in Railway-Carriage Wheels; and do hereby declare the same to be fully described in the following specification and represented in the accompanying drawings, of which—

Figure 1:
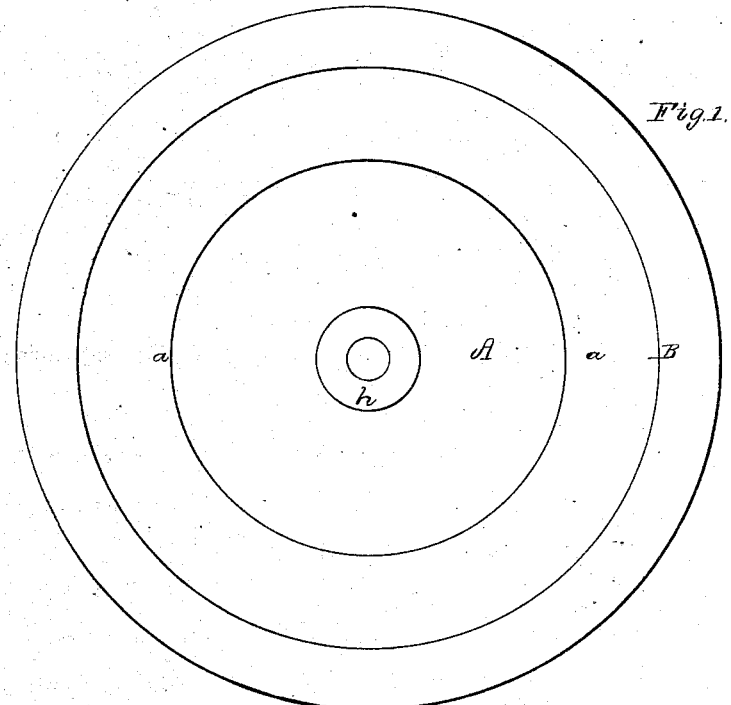
Figure 2:
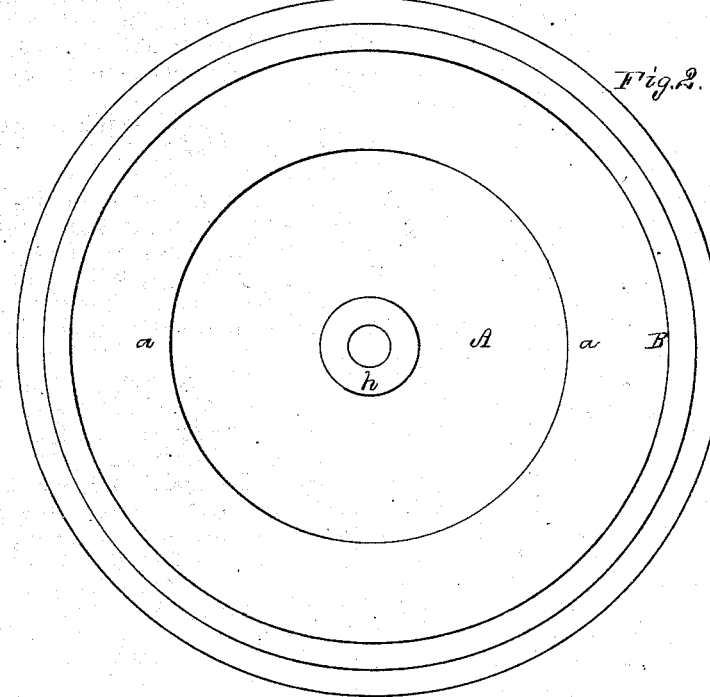
Figure 3:
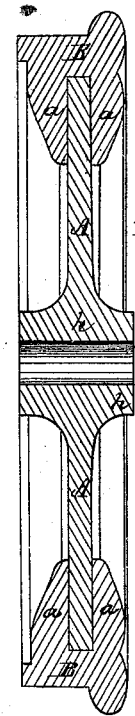

Figures 1 and 2 are opposite side elevations, and Fig. 3 a transverse section, of a wheel made in accordance with my invention, in the carrying out of which I form the body part of the wheel of wrought-iron and circular in shape, and cast thereon, so as to encompass the periphery of the said body, and have flanges to project down upon opposite sides of such body, a steel rim, all being as shown in the accompanying drawings, in which A denotes the wrought-iron body with its hub $h$; B, the rim, and $a\ a$ its two flanges. The rim, with its flanges, in the process of casting such upon the body, may be welded to the body, such body being previously raised to or nearly to a welding heat; or, instead thereof, the part of the body to enter between the flanges of the rim may have a series of holes made in it for the metal to pass through; or it may be indented or scored to receive the metal from either or both the flanges, in order to prevent the rim from turning on the body.

Figure 4:
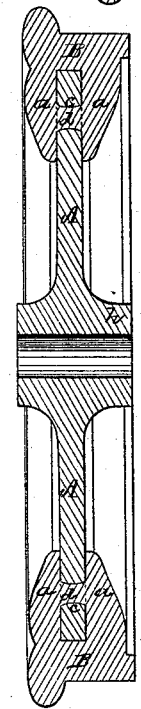

Fig. 4 is a transverse section of the wheel, as made with holes $c\ c$ through the body, to receive the metal of the rim or form the flanges, as shown at $d\ d$, when cast on the body.

Preparatory to casting the steel rim upon the body I prefer to heat the latter, in order that it may contract with the rim as the latter may cool.

A wheel so made possesses remarkable strength and durability, and has great advantages over one constructed with a cast-iron body and a cast-steel rim united by casting the two at one or about the same time, and either against the other. The casting of the steel rim with flanges to extend from it down on opposite sides of the body not only greatly strengthens the rim, but supports and connects it firmly on or to the body, in a manner different from that in which a cast-steel rim has generally been applied to a cast-metal body.

I do not claim a wheel having a cast-steel rim and a cast-metal body.

What I claim is—

1. A railway-carriage wheel composed of a wrought-iron body, A, and of a cast-steel rim, B, founded upon the periphery of said body, and with flanges $a\ a$ to project and lap on its opposite sides, and extend entirely around such body, all combined substantially as specified and represented.

2. The railway-carriage wheel composed of a wrought-iron body, A, and of a cast-steel rim, B, founded upon the periphery of the said body, and with flanges $a\ a$ to extend around and on opposite sides of the body, and also having the cast-steel of the rim extended from either or both of the flanges into or through the body, all combined substantially as set forth.

JAMES LELAND.

Witnesses:
R. H. EDDY,
J. R. SNOW.